United States Patent [19]

Inoue et al.

[11] Patent Number: 4,645,672

[45] Date of Patent: Feb. 24, 1987

[54] PREPARATION OF IMPROVED BREAD WITH GAMMA-GLUTAMYL TRANSFERASE

[75] Inventors: Seijiro Inoue, Machida; Shigenori Ota, Komae, both of Japan

[73] Assignee: Kyowa Hakko Kogyo Co., Ltd., Tokyo, Japan

[21] Appl. No.: 619,920

[22] Filed: Jun. 12, 1984

[30] Foreign Application Priority Data

Jun. 17, 1983 [JP] Japan .................................. 58-108847

[51] Int. Cl.$^4$ .......................... A21D 8/04; C12N 9/10; C12N 9/20

[52] U.S. Cl. ...................................... 426/20; 435/193; 435/198

[58] Field of Search ........................ 426/18, 19, 20, 22, 426/26, 27; 435/189, 193, 198, 212

[56] References Cited

U.S. PATENT DOCUMENTS

| | | |
|---|---|---|
| 1,907,764 | 5/1933 | Epstein et al. ........................ 426/20 |
| 3,368,903 | 2/1968 | Johnson et al. ...................... 426/20 |
| 3,494,770 | 2/1970 | Smerak et al. ....................... 426/20 |
| 3,520,702 | 7/1970 | Menzi .................................... 426/18 |
| 3,578,462 | 5/1971 | Smerak et al. ....................... 426/20 |
| 4,087,328 | 5/1978 | Suraisgood ..................... 435/189 X |
| 4,567,046 | 1/1986 | Inoue et al. ........................... 426/20 |

FOREIGN PATENT DOCUMENTS

| | | | |
|---|---|---|---|
| 132879 | 8/1982 | Japan .................................. 435/189 |
| 646311 | 11/1950 | United Kingdom .................. 426/20 |

OTHER PUBLICATIONS

The Condensed Chemical Dictionary, 8th ed., VNR Co., N.Y. 1971, p. 420.
Methods in Enzymology, vol. XVIIA, Academic Press, N.Y., 1970, pp. 876–889.

*Primary Examiner*—David M. Naff
*Attorney, Agent, or Firm*—Antonelli, Terry & Wands

[57] ABSTRACT

A process for producing bread includes the steps of adding a glutathione decomposing enzyme to the ingredients of dough and thereafter mixing, dividing, molding, proofing and baking. The glutathione decomposing enzyme is admixed with the dough in an amount of 0.5 to 20 units per kg of wheat flour in the dough. Preferably, the glutathione decomposing enzyme is gamma-glutamyl transferase.

4 Claims, No Drawings

PREPARATION OF IMPROVED BREAD WITH GAMMA-GLUTAMYL TRANSFERASE

The present invention relates to a bread improver and a process for producing bread using this improver.

More specifically, the present invention relates to a bread improver which contains a glutathione decomposing enzyme and a process for producing bread which is characterized by preparing dough containing a glutathione decomposing enzyme and, thereafter, treating the prepared dough in a conventional manner to prepare bread.

Bread is produced via mechanical operations of mixing, dividing, molding, etc. The physical properties of dough; e.g., elasticity, extensibility, non-stickiness and moldability have an influence on the quality of bread. It is possible to improve the quality of bread by improving these physical properties. The quality of bread is determined by such indexes as taste, odor, mouthfeel, volume and inner structure.

Currently, various bread improvers are being employed for the improvement of the physical properties of bread dough and the quality of bread. For example, various emulsifiers (e.g., monoglyceride and calcium stearyl lactylate), oxidizing or reducing agent (e.g., potassium bromate and ascorbic acid), L-cystine, protease, amylase and lipase are being employed, but completely satisfactory effects have not been obtained.

The present inventors previously filed an application for a patent on a process for producing bread by treating dough containing phospholipase A as an excellent bread improver in the conventional manner (Japanese Patent Application No. 197098/1982 and U.S. Ser. No. 548,514, filed Nov. 3, 1983, now U.S. Pat. No. 4,567,046). Bread improvers for obtaining bread of high quality are always being sought. Studies of various improvers have been made in order to produce bread of excellent quality, and as the result, it has now been found that a glutathione decomposing enzyme has an excellent effect upon the quality of bread.

The present invention is described in more detail below.

As the glutathione decomposing enzyme used in the present invention, any enzyme which decomposes glutathione may be used. Known examples of such enzyme are glutathione oxidase, $\gamma$-glutamyl tranferase (EC 2.3.2.2) and cysteinyl glycine dipeptidase (EC 3.4.13.6), which are widely distributed in animal tissues, plants (e.g., soy bean, mushroom and onion), etc.

When an animal organ, for example, pig kidney is used as an enzyme source, the pig kidney from which fat has been removed is minced, washed with acetone and dried prior to use.

The amount of the glutathione decomposing enzyme to be added is determined depending on the quality of wheat flour, the degree of the improvement of bread quality which is required, the kind of bread, the method of breadmaking, the proportions of the ingredients, etc. Generally, 0.5–20 units (expressed by $\gamma$-glutamyl transferase activity at pH 5.5 and 30° C.) of the enzyme is used per kg of flour according to the indication based on $\gamma$-glutamyl transferase activity shown in Reference Example 1 described hereinafter.

The glutathione decomposing enzyme is usually added at the time of dough mixing. Alternatively, the enzyme may be mixed with either flour or a baker's flour mix containing various auxiliary ingredients. Such alternative methods have the advantage in that the need for weighing and adding the glutathione decomposing enzyme each time the ingredients are charged for breadmaking is saved, and in that an enzymatic reaction gradually proceeds during storage whereby the effect of improving the quality of bread is heightened. This advantage is another aspect of the present invention.

The effect of the addition of the glutathione decomposing enzyme manifests itself in the physical properties of dough and the quality of bread. By the addition of the present enzyme, the dough has improved elasticity and suppressed stickiness, and also dough roughening on molding is inhibited, whereby operations in the respective steps become easier. When the present enzyme is added, the volume of the product is increased, the crumb exhibits a fine structure with a well developed film network and an appropriate softness is obtained. Further, by the present invention, the tendency of the bread to become stable during storage is suppressed.

Another characteristic of the baking improving effect of the present invention which should be especially mentioned is manifested when the present enzyme is applied to low-protein flour which has a protein content less than 12% and is less suitable for breadmaking, such as domestic (Japanese) flour. In the case of such flour, good result in breadmaking is not expected as described above, but by the use of the present enzyme, the above-described improving effect is manifested, and the operability and the product quality are both considerably improved.

Examples of the oxidizing or reducing agent used in combination with the glutathione decomposing enzyme include potassium bromate and ascorbic acid, examples of the emulsifier include monoglyceride and calcium stearyl lactylate, and examples of the enzyme preparation incude phosphlipase A. Generally, 0.0005–0.01% (w/w) oxidizing or reducing agent and 0.05–0.5% (w/w) emulsifier are used on the basis of flour, and 10–400 units of the enzyme preparation is used per kg of flour.

The bread improver according to the present invention may be applied to either the sponge and dough method or the straight dough method.

When the sponge and dough method is employed as the breadmaking process, the glutathione decomposing enzyme and if necessary, phospholipase A, an emulsifier or an oxidizing or reducing agent are added to at least one of the sponge mix mainly comprising flour and baker's yeast, and the dough mix mainly comprising flour, sugar and shortening. It is desired that the glutathione decomposing enzyme and phosphlipase A are added to the sponge mix.

Breadmaking by the sponge and dough method is effected, for example, as follows:

Water is added to the sponge mix mainly comprising flour and baker's yeast, and the ingredients are mixed and fermented generally at 25°–35° C. for 2–5 hours (sponge fermentation). The fermented product is mixed with the dough mix mainly comprising flour, sugar and shortening, and the mixture is further mixed with water to make a dough.

The dough is left generally at 25°–35° C. for 10–40 minutes (floor time). Thereafter, it is divided according to the size of the intended bread, and left generally at 15°–35° C. for 10–30 minutes (bench time). Subsequently, the dough is molded, put into pans and subjected to final fermentation (proofing) generally at 35°–45° C. until it expands to a certain height, and baking is conducted at 180°–240° C. for 10–30 minutes to produce bread.

Breadmaking by the straight dough method is effected, for example, as follows:

Water is added to the ingredients of dough mainly comprising flour, sugar, shortening and yeast food, and after mixing, the mixed product is fermented generally at 25°–35° C. for 60–180 minutes. The dough is divided according to the size of the intended bread, and left generally at 15°–35° C. for 10–30 minutes (bench time). Subsequently, the dough is molded, put into pans, and subjected to final fermentation (proofing) generally at 35°–45° C. until it expands to a certain height. Thereafter, it is baked at 180°–240° C. for 10–30 minutes to produce bread.

The bread produced according to the present invention by either method has a large volume and is suitably soft, and its interior is characterized by a well stretched structure in film form. In addition, the bread can be stored for a prolonged period without becoming significantly stale.

Certain specific embodiments of the present invention are illustrated by the following representative examples and reference examples where "%" refers to wt. %, unless otherwise indicated.

EXAMPLE 1

The present example shows the improving effect of the glutathione decomposing enzyme prepared in Reference Example 1 on high-gluten flour (protein level 12.1%) in breadmaking.

Bread was produced according to the following steps and proportions:

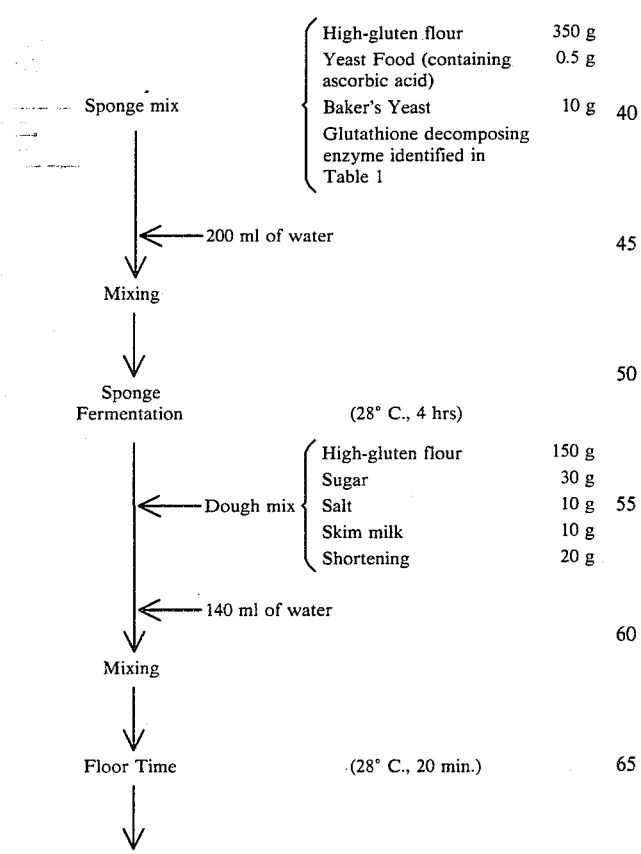

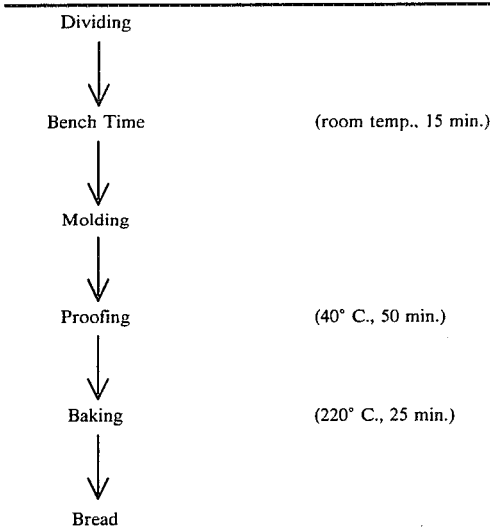

The test groups are shown in Table 1, and the evaluation of the physical properties of the dough during the process of breadmaking and the quality of the product after two days of storage at 15° C. in a sealed package is shown in Table 2.

TABLE 1

| Test Group | Additive | Amount of additive (%) based on total flour (units/kg flour) | |
|---|---|---|---|
| I | No additive | | |
| II | Glutathione decomposing enzyme (obtained in Reference Example 1) | 0.025 | (0.92) |
| III | Glutathione decomposing enzyme (obtained in Reference Example 1) | 0.05 | (1.83) |
| IV | Glutathione decomposing enzyme (obtained in Reference Example 1) | 0.1 | (3.66) |

TABLE 2

| | Test Group | | | |
|---|---|---|---|---|
| | I | II | III | IV |
| Physical properties (1) of dough | | | | |
| elasticity | ○ | ○ | ◉ | ◉ |
| extensibility | △ | △ | △ | △ |
| non-stickiness | △ | ○ | ◉ | ◉ |
| moldability | △ | ○ | ○ | ◉ |
| Bread quality | | | | |
| specific volume (2) | 4.51 | 4.55 | 4.66 | 4.70 |
| film stretching in inner structure | △ | ○ | ◉ | ◉ |
| texture of inner structure | △ | △ | ○ | ○ |
| flavor | ○ | ○ | ○ | ○ |
| relative staleness (3) | 100 | 98 | 95 | 93 |

(1) Evaluation Standard (organoleptic evaluation by experts):
Very good: ◉
Good: ○
Moderate: △
Poor: X
(2) Specific Volume: measured by the rapeseed displacement method
(3) Relative Staleness: measured using a Baker's Compressimeter, and compared with the value of the control taken as 100.

With the increase in the amount of the glutathione decomposing enzyme added in the order, Test groups II, III and IV, the improving effect was increased in respect of physical properties of dough, specific volume, inner structure and prevention in becoming stale.

EXAMPLE 2

The present example shows the improving effect of the glutathione decomposing enzyme on imported low-protein flour and domestic low-protein flour in breadmaking. Procedures similar to those in Example 1 were repeated except that the high-gluten flour used in Example 1 was replaced by the flour and additives shown in Table 3. The water absorption was effected at the levels shown in Table 3.

The evaluation of the physical properties of the dough during the process of breadmaking and the quality of the product after two days of storage is shown in Table 4.

TABLE 3

| Test Group | Flour | Crude Protein (%) | Water Absorption (%) | Additive | Amount of additive (%) based on total flour (units/kg flour) |
| --- | --- | --- | --- | --- | --- |
| I | Imported flour | 10.1 | 58 | No additive | |
| II | Imported flour | 10.1 | 58 | Glutathione decomposing enzyme (obtained in Reference Example 1) | 0.1 (3.66) |
| III | Domestic flour A | 9.5 | 60 | No additive | |
| IV | Domestec flour A | 9.5 | 60 | Glutathione decomposing enzyme (obtained in Reference Example 1) | 0.1 (3.66) |
| V | Domestic flour B | 10.6 | 60 | No additive | |
| VI | Domestic flour B | 10.6 | 60 | Glutathione decomposing enzyme (obtained in Reference Example 1) | 0.1 (3.66) |

TABLE 4

| | Test Group | | | | | |
| --- | --- | --- | --- | --- | --- | --- |
| | I | II | III | IV | V | VI |
| Physical properties of dough | | | | | | |
| elasticity | X | O | X | O | X | O |
| extensibility | X | O | X | O | X | O |
| non-stickiness | X | O | X | O | X | O |
| moldability | X | O | X | Δ | X | O |
| Bread quality | | | | | | |
| specific volume | 4.05 | 4.21 | 4.10 | 4.36 | 4.24 | 4.45 |
| film stretching in inner structure | X | O | X | O | X | O |
| texture of inner structure | X | O | X | O | X | ⊙ |
| flavor | Δ | Δ | Δ | Δ | Δ | Δ |
| relative staleness | 100 | 89 | 100 | 87 | 100 | 80 |

Note
Evaluation Method: Same as in the case of Table 2.

The improved low-protein flour and the domestic low-protein flour gave very poor results in both physical properties of the dough and the quality of the product when the glutathione decomposing enzyme was not added. However, by the addition of 0.1% glutathione decomposing enzyme, the mixing tolerance of the dough was increased, the dough became somewhat firm, and the specific volume, inner structure and degree of becoming stale were considerably improved.

The effect of the glutathione decomposing enzyme on these kinds of flour were greater than the effect on the high-gluten flour shown in Example 1.

EXAMPLE 3

The present example shows, as examples of combination of the glutathione decomposing enzyme and other improvers, effects of combined use with calcium stearyl lactylate (CSL) which is widely used in breadmaking and with phospholipase A the improving effect of which had been discovered by the present inventors. As the phospholipase A preparation, pig pancreatic phospholipase A (produced by Sigma Co.) was used. As the flour, high-gluten flour (protein level 12.1%) was used. Procedures similar to those in Example 1 were repeated except that the glutathione decomposing enzyme shown in Table 1 in Example 1 was replaced by the additives in Table 5.

The evaluation of the physical properties of the dough during the process of breadmaking and the quality of the product after two days of storage is shown in Table 6.

As compared with the case where the glutathione decomposing enzyme alone was added, the use of the glutathione decomposing enzyme with CSL or phospholipase A further enhanced the physical properties of the dough and the quality of the product. In particular, the synergistic effect on the specific volume and staling prevention was great.

TABLE 5

| Test Group | Additive | Amount of additive (%) based on total flour (units/kg flour) |
| --- | --- | --- |
| I | No additive | |
| II | Glutathione decomposing enzyme (obtained in Reference Example 1) | 0.1 (3.66) |
| III | C S L | 0.2 |
| IV | Phospholipase A | 0.04 |
| V | Glutathione decomposing enzyme (obtained in Reference Example 1) | 0.1 (3.66) |
| | C S L | 0.2 |
| VI | Glutathione decomposing enzyme (obtained in Reference Example 1) | 0.1 (3.66) |
| | Phospholipase A | 0.04 |

TABLE 6

| | Test Group | | | | | |
| --- | --- | --- | --- | --- | --- | --- |
| | I | II | III | IV | V | VI |
| Physical properties | | | | | | |

TABLE 6-continued

| | Test Group | | | | | |
|---|---|---|---|---|---|---|
| | I | II | III | IV | V | VI |
| of dough | | | | | | |
| elasticity | ○ | ◉ | △ | ○ | ◉ | ◉ |
| extensibility | △ | △ | ◉ | ○ | ◉ | ○ |
| non-stickiness | △ | ◉ | △ | ○ | ◉ | ◉ |
| moldability | △ | ◉ | ○ | ◉ | ◉ | ◉ |
| Bread quality | | | | | | |
| specific volume | 4.56 | 4.75 | 4.65 | 4.68 | 4.80 | 4.94 |
| film stretching in inner structure | △ | ◉ | ○ | ◉ | ◉ | ◉ |
| texture of inner structure | △ | ○ | ◉ | ○ | ◉ | ◉ |
| flavor | ○ | ○ | △ | ○ | △ | ○ |
| relative staleness | 100 | 93 | 88 | 89 | 79 | 77 |

Note
Evaluation method: Same as in the case of Table 2.

EXAMPLE 4

The present example shows examples of the addition to flour. Procedures similar to those in Example 1 were repeated except that the glutathione decomposing enzyme shown in Table 1 in Example 1 and the high-gluten flour in the sponge mix therein were replaced by high-gluten flour containing glutathione decomposing enzyme shown in Table 7.

The evaluation of the physical properties of the dough during the process of breadmaking and the quality of the product after two days of storage is shown in Table 8.

TABLE 7

| Test group | Additive |
|---|---|
| I | No additive |
| II | High-gluten flour containing 0.05% glutathione decomposing enzyme (1.83 units/kg flour) obtained in Reference Example 1 |
| III | High-gluten flour containing 0.1% glutathione decomposing enzyme (3.66 units/kg flour) obtained in Reference Example 1 |

TABLE 8

| | Test Group | | |
|---|---|---|---|
| | I | II | III |
| Physical properties of dough | | | |
| elasticity | ○ | ◉ | ◉ |
| extensibility | △ | △ | △ |
| non-stickiness | △ | ○ | ◉ |
| moldability | △ | ○ | ◉ |
| Bread quality | | | |
| specific volume | 4.46 | 4.58 | 4.64 |
| film stretching in inner structure | △ | ○ | ◉ |
| texture of inner structure | △ | ○ | ○ |
| flavor | ○ | ○ | ○ |
| relative staleness | 100 | 96 | 93 |

Note
Evaluation method: Same as in the case of Table 2.

Similarly to the case of the separate addition of the glutathione decomposing enzyme in Example 1, the physical properties of the dough and the quality of the product were improved in Test groups II and III, as compared with Test group I.

EXAMPLE 5

In the present example, as one example showing use of the glutathione decomposing enzyme, the glutathione decomposing enzyme obtained in Reference Example 1 was added to prepare the mixture of the ingredients shown in Table 9. As a control, the mixture of the ingredients shown in Table 9 except the glutathione decomposing enzyme was used, and bread was produced by the straight dough method.

The evaluation of the physical properties of the dough during the process of breadmaking and the quality of the product after two days of storage is shown in Table 10.

TABLE 9

| | Mixing ratio (%) |
|---|---|
| High-gluten flour | 87.55 |
| Refined sugar | 4.00 |
| Salt | 1.75 |
| Shortening | 4.00 |
| Yeast food (containing ascorbic acid) | 0.10 |
| Milk powder | 2.00 |
| Defatted soy bean powder | 0.50 |
| Glutathione decomposing enzyme (obtained in Reference Example 1) | 0.10 |

TABLE 10

| | Control | Test group (Mixture of ingredients shown in Table 9) |
|---|---|---|
| Physical properties of dough | | |
| elasticity | ○ | ◉ |
| extensibility | △ | △ |
| non-stickiness | △ | ◉ |
| moldability | △ | ◉ |
| Bread quality | | |
| specific volume | 4.44 | 4.60 |
| film stretching in inner structure | △ | ◉ |
| texture of inner structure | △ | ○ |
| flavor | ○ | ○ |
| relative staleness | 100 | 94 |

Note
Evaluation method: Same as in the case of Table 2.

Also in the case of the straight dough method, as in the case of the sponge and dough method, better results were obtained with the mixture of the ingredients shown in Table 9 including the glutathione decomposing enzyme obtained in Reference Example 1 in both the physical properties of the dough and the quality of the product as compared with the control.

EXAMPLE 6

The present example shows the influence of L-glutamic acid, L-cystine and glycine produced by the action of the glutathione decomposing enzyme on the production of bread. Using high-gluten flour (protein level 12.1%) as flour, procedures similar to those in Example 1 were repeated except that the glutathione decomposing enzyme shown in Table 1 in Example 1 was replaced by the additives shown in Table 11.

The evaluation of the physical properties of the dough during the process of breadmaking and the quality of the product after two days of storage is shown in Table 12.

With the L-glutamic acid and glycine, the improving effect on breadmaking was not observed. With the L-cystine, although some improving effect was observed on the specific volume and the inner structure, the physical properties of the dough were not improved and moreover, the improving effect was smaller as compared with the glutathione decomposing enzyme.

TABLE 11

| Test group | Additive | Amount of additive [ppm] based on total flour |
|---|---|---|
| I | No additive | |
| II | Glutathione decomposing enzyme (obtained in Reference Example 1) | 1000 (3.66 units/kg flour) |
| III | L-Glutamic acid | 20 |
| IV | L-Cystine | 20 |
| V | Glycine | 20 |
| VI | L-Glutamic acid | 20 |
| | L-Cystine | 20 |
| | Glycine | 20 |

TABLE 12

| | Test Group | | | | | |
|---|---|---|---|---|---|---|
| | I | II | III | IV | V | VI |
| Physical properties of dough | | | | | | |
| elasticity | ○ | ⊙ | ○ | ○ | ○ | ○ |
| extensibility | △ | △ | △ | △ | △ | △ |
| non-stickiness | △ | ⊙ | △ | △ | △ | △ |
| moldability | △ | ⊙ | △ | △ | △ | △ |
| Bread quality | | | | | | |
| specific volume | 4.55 | 4.71 | 4.53 | 4.64 | 4.55 | 4.66 |
| film stretching in inner structure | △ | ⊙ | △ | ○ | △ | ○ |
| texture of inner structure | △ | ○ | △ | △ | △ | △ |
| flavor | ○ | ○ | ○ | ○ | ○ | ○ |
| relative staleness | 100 | 93 | 101 | 98 | 99 | 97 |

Note
Evaluation method: Same as in the case of Table 2.

Reference Example 1

(Process for the Production of the Glutathione Decomposing Enzyme)

In this Reference Example, 500 g of a fresh pig kidney from which the fat part had been removed was minced, and 2.5 l of acetone cooled to −20° C. was added thereto, followed by homogenization for 10 minutes.

The homogenate was filtered with suction, and the residue was washed and filtered with suction several times using 3 l (total volume) of acetone cooled to −20° C. The washed residue was dried in vacuum, and powdered. Thus, 84.4 g of a crude enzyme powder was obtained from 500 g of the pig kidney.

Measurement of γ-Glutamyl Transferase Activity

The glutathione-decomposing activity can be expressed by the activity of γ-glutamyl transferase, a key enzyme for glutathione decomposition.

The activity was measured by reacting γ-glutamyl-p-nitroanilide as a substrate with the enzyme and colorimetrically determining p-nitroaniline produced by an enzymatic reaction at a wavelength of 410 nm.

One ml of an enzyme dispersion obtained by dispersing the crude enzyme powder prepared in the present reference example in water at a concentration of 0.01–0.2% was previously warmed at 30° C. for 5 minutes. Then, one ml of a substrate [10 mM γ-glutamyl-p-nitroanilide/0.2M acetate buffer (pH 5.5) or a 0.2M tris-hydrochloric acid buffer (pH 9.0)] also previously warmed at 30° C. was added to the enzyme dispersion, and the enzymatic reaction was carried out at pH 5.5 or pH 9.0 at 30° C. Exactly ten minutes later, the reaction was stopped by addition of 2 ml of 20% acetic acid. After centrifugation, the produced p-nitroaniline was colorimetrically determined at a wavelength of 410 nm.

The γ-glutamyl transferase activity is indicated as a unit, one unit being defined as that amount of the enzyme which produces 1 μmole of p-nitroaniline in one minute.

The γ-glutamyl transferase activity of the present enzyme preparation is shown in Table 13.

TABLE 13

| Reaction Conditions | γ-Glutamyl Transferase Activity [Units/g] |
|---|---|
| pH 5.5 - 30° C. | 3.66 |
| pH 9.0 - 30° C. | 61.2 |

Confirmation of Decomposition of Glutathione by the Enzyme Preparation

The reactivity of the present enzyme preparation with glutathione was determined by reacting reduced glutathione as a substrate with the enzyme, separating the enzymatic reaction product by thin layer chromatography, and determining the intensity of color developed with ninhydrin.

The crude enzyme powder prepared in the present reference example was dispersed in a 1/30M acetate buffer (pH 5.5) at a concentration of 0.2–4%. To 1 ml of the dispersion was added 1 ml of a substrate [4 mM reduced glutathione/1/30M acetate buffer (pH 5.5)], and the enzymatic reaction was carried out at pH 5.5 at 30° C. Four hours later, the reaction was stopped by heating in boiling water for 10 minutes. Then, 2 μl of the reaction mixture was spotted on a silica gel thin layer plate, and developed with n-butanol-pyridine-water (1:1:1 v/v). After termination of the development, the plate was dried in air, and caused to develop a color using a ninhydrin reagent. Each spot was identified using a standard amino acid reagent.

The reduced glutathione decomposing activity of the present enzyme preparation is shown in Table 14.

As shown in Table 14, by the reaction at an enzyme concentration of 1% (enzyme/substrate ratio by weight: 8.2), pH 5.5 and 30° C. for 4 hours, the reduced glutathione has been completely decomposed to the constituting amino acids, namely, L-glutamic acid, L-cystine and glycine by the actions of glutathione oxidase, γ-glutamyl transferase and cysteinyl glycine dipeptidase.

TABLE 14

| | Enzyme Concentration in the Reaction Mixture (%) | | |
|---|---|---|---|
| | 0 | 0.4 | 1 |
| Reduced glutathione | +++ | + | − |
| L-Glutamic Acid | − | ++ | +++ |
| Glycine | − | + | ++ |
| L-Cysteine | − | − | − |
| L-Cystine | − | + | ++ |

Note
Explanation of Symbols
+++: Detected abundantly
++: Detected
+: Detected very slightly
−: Not detected

Reference Example 2

(Determination of Glutathione in Flour)

The present reference example describes the method for the determination of glutathione in flour and the glutathione decomposing activity of the glutathione decomposing enzyme on flour dough.

Method for Determination of Glutathione in Flour

This determination method comprises extracting glutathione from flour, reducing it, reacting it with 5,5'-dithio-bis-(2-nitrobenzoic acid), and separating and quantitatively determining it by high performance liquid chromatography.

First, 3 ml of 0.2M sodium chloride was added to 1 g of flour. The mixture was stirred for extraction for 5 minutes, and the residue was removed by centrifugation. 20 μl of 0.2M dithiothreitol [solution in 0.5M phosphate buffer (pH 8.0)] was added to 1 ml of the supernatant, and after reduction of the oxidized glutathione at room temperature, 0.1 ml of 0.2M 5,5'-dithio-bis-(2-nitrobenzoic acid) [solution in 0.5M phosphate buffer (pH 8.0)] was added, and reacted with the reduced glutathione. After completion of the reaction, 0.5 ml of 2.5% zinc sulfate and 0.5 ml of 0.15N barium hydroxide were added to precipitate and remove the concomitantly extracted protein. Then, 80 μl of formic acid was added to 1 ml of the supernatant from which the protein had been removed. After stirring, the unreacted 5,5'-dithio-bis-(2-nitrobenzoic acid) was extracted and washed with 1 ml of water-saturated ethyl acetate. Washing with the water-saturated ethyl acetate was repeated four times. 10 μl portion was taken from the washed aqueous layer part, the glutathione was separated and quantitatively determined using high performance liquid chromatography. Separately, a standard glutathione solution was prepared and treated similarly, and a calibration curve was prepared. The high performance liquid chromatography was carried out using a NUCLEOSIL 10-$C_{18}$ column (4.6×250 mm), and as the mobile phase, 0.025M ammonium foramate-methanol (9:1).

Examples of the results of determination of glutathione in flour by the present method are shown in Table 15.

TABLE 15

| Flour | Glutathione Content [ppm] |
| --- | --- |
| Domestic flour A | 32.5 |
| Domestic flour B | 43.6 |

Decomposing Activity of the Enzyme Preparation upon Glutathione in Flour

In order to examine the decomposing activity of the glutathione decomposing enzyme preparation prepared in Reference Example 1 upon glutathione in flour, flour dough was prepared and the glutathione was determined.

The flour dough was prepared by adding 30 ml of water and 50 mg (0.1% based on flour) of the crude enzyme powder prepared in Reference Example 1 to 50 g of flour and mixing for 2 minutes. The dough was freeze-dried either immediately after the mixing or after standing at 30° C. for 4 hours, and assayed for the glutathione by the method described above.

The results of the glutathione assay of the flour dough containing the glutathione decomposing enzyme are shown in Table 16.

As can be seen from Table 16, in the case where the glutathione decomposing enzyme was incorporated, the glutathione was hardly decomposed without the reaction at 30° C. for 4 hours, but by this reaction, about 70% of the glutathione present in flour was decomposed.

TABLE 16

| | Glutathione Decomposing Enzyme | Reaction at 30° C. for 4 hrs. | Glutathione content [ppm] |
| --- | --- | --- | --- |
| Flour | — | — | 32.5 |
| Dough | — | — | 34.1 |
| | + | — | 30.2 |
| | — | + | 27.9 |
| | + | + | 8.8 |

What is claimed is:

1. A process for producing bread which comprises the steps of adding γ-glutamyl transferase to the ingredients of dough including wheat flour, baker's yeast and water in an amount of 0.5 to 20 units per kg of the wheat flour and thereafter mixing the γ-glutamyl transferase with the dough by kneading and subsequently forming the dough into bread.

2. A process according to claim 1, wherein the step of forming the dough into bread includes dividing, molding, proofing and baking of the dough containing the γ-glutamyl transferase.

3. A composition for making bread which comprises wheat flour, salt, sugar, shortening and yeast food to which has been added γ-glutamyl transferase in an amount of 0.5 to 20 units per kg of the wheat flour.

4. A composition according to claim 3, which further comprises from 10 to 400 units of phospholipase A per kg of the flour.

* * * * *